(12) United States Patent
Mishra et al.

(10) Patent No.: US 11,579,185 B2
(45) Date of Patent: Feb. 14, 2023

(54) MAXIMIZATION OF SIDE-CHANNEL SENSITIVITY FOR TROJAN DETECTION

(71) Applicant: University of Florida Research Foundation, Inc., Gainesville, FL (US)

(72) Inventors: Prabhat Kumar Mishra, Gainesville, FL (US); Yangdi Lyu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 278 days.

(21) Appl. No.: 16/893,696

(22) Filed: Jun. 5, 2020

(65) Prior Publication Data

US 2021/0003630 A1    Jan. 7, 2021

Related U.S. Application Data

(60) Provisional application No. 62/869,288, filed on Jul. 1, 2019.

(51) Int. Cl.
  *G01R 31/28* (2006.01)
  *G01R 31/3185* (2006.01)
  (Continued)

(52) U.S. Cl.
  CPC ..... *G01R 31/2843* (2013.01); *G01R 31/2803* (2013.01); *G01R 31/2839* (2013.01);
  (Continued)

(58) Field of Classification Search
  None
  See application file for complete search history.

(56) References Cited

U.S. PATENT DOCUMENTS 9,081,991 B2 * 7/2015 Jyothi ................ G06F 21/71
11,010,523 B1 * 5/2021 Huang ............... G06F 17/18
(Continued)

FOREIGN PATENT DOCUMENTS

CN  107656839 A * 2/2018 ........ G01R 31/2851
CN  108427893 A * 8/2018 ............ G06F 21/76
(Continued)

OTHER PUBLICATIONS

Lyu et al, Efficient Test Generation for Trojan Detection using Side Channel Analysis, 2019, Design, Automation And Test in Europe, pp. 408-413 (Year: 2019).*
(Continued)

*Primary Examiner* — Jermele M Hollington
(74) *Attorney, Agent, or Firm* — Thomas | Horstemeyer, LLP (57) ABSTRACT

An exemplary method of detecting a Trojan circuit in an integrated circuit is related to applying a test pattern comprising an initial test pattern followed by a corresponding succeeding test pattern to a golden design of the integrated circuit, wherein a change in the test pattern increases side-channel sensitivity; measuring a side-channel parameter in the golden design of the integrated circuit after application of the test pattern; applying the test pattern to a design of the integrated circuit under test; measuring the side-channel parameter in the design of the integrated circuit under test after application of the test pattern; and determining a Trojan circuit to be present in the integrated circuit under test when the measured side-channel parameters vary by a threshold.

20 Claims, 8 Drawing Sheets

(51) Int. Cl.
*G01R 31/317* (2006.01)
*G06F 21/57* (2013.01)
(52) U.S. Cl.
CPC .......... *G01R 31/31718* (2013.01); *G01R 31/318547* (2013.01); *G06F 21/57* (2013.01)

(56) References Cited

U.S. PATENT DOCUMENTS

| | | | | |
|---|---|---|---|---|
| 11,023,623 | B2* | 6/2021 | Schat | G06F 21/71 |
| 11,144,648 | B2* | 10/2021 | Bhunia | G06F 21/71 |
| 11,321,510 | B2* | 5/2022 | Bhunia | G06F 21/55 |
| 2021/0049266 | A1* | 2/2021 | Schat | G06F 21/567 |
| 2021/0240866 | A1* | 8/2021 | Mishra | G06F 21/566 |
| 2021/0304002 | A1* | 9/2021 | George | G06N 3/04 |
| 2022/0188415 | A1* | 6/2022 | Mishra | G06F 21/556 |

FOREIGN PATENT DOCUMENTS

| | | | | |
|---|---|---|---|---|
| CN | 108898034 A | * | 11/2018 | ........ G06F 21/76 |
| CN | 109522755 A | * | 3/2019 | |
| CN | 112464297 A | * | 3/2021 | |
| WO | WO-2020073059 A1 | * | 4/2020 | ........ G06F 21/566 |

OTHER PUBLICATIONS

Lyu et al, Efficient Test Generation for Trojan Detection using Side Channel Analysis, May 16, 2019, IEEE Xplore via Design, Automation And Test in Europe, pp. 408-413 (Year: 2019).*
Farahmandi et al. "Trojan Localization using Symbolic Algebra". IEEE, pp. 591-597. 2017.
Huang et al. "Scalable Test Generation for Trojan Detection Using Side Channel Analysis". IEEE Transactions Information Forensics and Security. vol. 13, No. 11, pp. 2746-2760, Nov. 2018.
Ahmed et al., "Scalable Hardware Trojan Activation by interleaving Concrete Simulation and Symbolic Execution". IEEE. pp. 1-10. 2018.
Lyu et al. "Automated Trigger Activation by Repeated Maximal Clique Sampling". IEEE, pp. 482-487. 2020.
Chakrabor Iy et ai. "Mero: A Statistical Approach for Hardware Trojan Detection". 15 pages. 2009.
Amyeen et al. "Evaluation of the Quality of N-Detect Scan ATPG Patterns on a Processor". IEEE. pp. 669-678. 2004.
Wolff et al. "Towards Trojan-Free Trusted ICs: Problem Analysis and Detection Scheme". IEEE. 4 pages. 2008.
Cruz et al. "Hardware Trojan Detection using ATPG and Model Checking". IEEE Computer Society. pp. 91-96. 2017.
Rad et al., "A Sensitivity Analysis of Power Signal Methods for Detecting Hardware Trojans Under Real Process and Environmental Conditions". IEEE on Very Large Scale Integration (VLSI) Systems. vol. 18, No. 12, pp. 1735-1744. Dec. 2010.
Salman et al. "Layout-Aware Switching Activity Localization to Enhance Hardware Trojan Detection". IEEE Transactions On Information Forensics And Security, vol. 7, No. 1, pp. 76-87. Feb. 2012.
Huang et al., "MERS: Statistical Test Generation for Side-Channel analysis based Trojan Detection". ACM. pp. 130-141. 2016.
Agrawal et al., "Trojan Detection using IC Fingerprinting". IEEE. 15 pages. 2007.
Jin et al. "Hardware Trojan Detection Using Path Delay Fingerprint". IEEE. 7 pages. 2008.
Saha et al. "Improved Test Pattern Generation for Hardware Trojan using Genetic Algorithm and Boolean Satisfiability". 20 pages. 2015.

* cited by examiner

FIG. 1

(a) The netlist of c17.

FIG. 2A (b) The netlist of c17 with Trojan inserted.

| Benchmarks | MERS-s (C = 5.0) | | | | Our Approach | | | | |
|---|---|---|---|---|---|---|---|---|---|
| | Average Orig Switch | Sensitivity | Time (s) | % of Trojans detected[1] | Average Orig Switch | Sensitivity | | Running Time | | % of Trojans detected[1] |
| | | | | | | Sensitivity | Impr. factor | Time (s) | Impr. factor | |
| c2670 | 271.3 | 3.8% | 3476 | 0% | 13.0 | 41.2% | 10.8x | 1008 | 3.4x | 100% |
| c5315 | 888.5 | 1.1% | 25178 | 0% | 29.4 | 16.9% | 15.4x | 4795 | 5.3x | 59.2% |
| c7552 | 477.0 | 1.1% | 49978 | 0% | 34.0 | 12.2% | 11.1x | 8002 | 6.2x | 51.9% |
| s13207 | 556.4 | 1.0% | 24385 | 0% | 5.4 | 61.9% | 61.9x | 4381 | 5.6x | 99.6% |
| s15850 | 698.4 | 0.0% | 20734 | 0% | 12.4 | 34.9% | 34.9x | 5795 | 5.1x | 87.9% |
| s35932 | 1386.6 | 0.6% | 6795 | 0% | 377.6 | 27.0% | 45.0x | 3696 | 1.8x | 75.1% |
| Average | 712.6 | 1.3% | 19360 | 0% | 104.9 | 32.4% | 30.5x | 3956 | 4.6x | 79% |

[1] We use sensitivity threshold of 10% based on [18]. A Trojan $t$ is detected if the sensitivity $p_t > 10\%$.

MAXIMIZATION OF SIDE-CHANNEL SENSITIVITY FOR TROJAN DETECTION

CROSS-REFERENCE TO RELATED APPLICATION

This application claims priority to U.S. provisional application entitled, "Maximization of Side-Channel Sensitivity for Trojan Detection," having Ser. No. 62/869,288, filed Jul. 1, 2019, which is entirely incorporated herein by reference.

TECHNICAL FIELD

The present disclosure is generally related to the detection of hardware Trojans.

BACKGROUND

Detection of hardware Trojans is vital to ensure the security and trustworthiness of System-on-Chip (SoC) designs. Side-channel analysis is effective for Trojan detection by analyzing various side-channel signatures such as power, current, and delay. As integrated circuit (IC) design and fabrication process become more and more globalized, the threat of hardware Trojan attack is increasing due to potential malicious modifications at different stages of the design and fabrication process.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In accordance with embodiments of the present disclosure, an exemplary efficient test generation technique is presented to facilitate side-channel analysis. While early work on current-aware test generation has proposed several promising ideas, there are two major challenges in applying it on large designs: (i) the test generation time grows exponentially with the design complexity, and (ii) an infeasibility in detecting Trojans since the side-channel sensitivity is marginal compared to the noise and process variations. The present disclosure addresses both challenges by effectively exploiting the affinity between the inputs and rare (suspicious) nodes. The present disclosure formalizes the test generation problem as a searching problem and solves the optimization using a genetic algorithm. Systems and methods of the present disclosure are configured to find the profitable test patterns that can increase (e.g., maximize) switching in the suspicious regions while minimize switching in the rest of the circuit. Experimental results demonstrate that exemplary techniques of the present disclosure can drastically improve both the side-channel sensitivity (30x on average) and time complexity (4.6x on average) compared to the state-of-the-art test generation techniques.

As an overview, hardware Trojans are malicious modifications incorporated in simple Integrated Circuits (ICs) or complex System-on-Chip (SoC) designs. There are several test generation efforts for detection of hardware Trojans. The existing test generation approaches can be broadly categorized as logic testing and side-channel analysis. Side-channel analysis does not require the full activation of the Trojan or propagation of the Trojan effect to the observable outputs. However, detection of small Trojans can be hard since the change in side-channel signatures due to the Trojans can be negligible compared to the noise or process variations. Logic testing is immune to noise and process variations, but requires both the activation of the Trojan and propagation of the Trojan effects to the observable outputs. Since the number of possible input patterns are exponential, Trojan detection using logic testing can be infeasible for large designs. While a Multiple Excitation of Rare Switching (MERS) approach tried to combine the advantages of logic testing and side channel analysis, there are two major challenges in applying the MERS approach on large designs. The test generation time using MERS grows exponentially with the design complexity. Moreover, it is infeasible to detect Trojans since the increase in side-channel sensitivity is marginal compared to the noise and process variations. Specifically, MERS can provide up to 3% sensitivity whereas typical process variations can be more than 10%. Exemplary approaches in accordance with the present disclosure addresses both of these challenges.

The present disclosure introduces an efficient approach to generate test patterns to increase (and even maximize) the side-channel sensitivity for Trojan detection. In this disclosure, dynamic current is targeted as the side-channel signature. However, such an approach can also be extended to other side-channel parameters with suitable modifications of the evaluation criteria. In accordance with embodiments of the present disclosure, the input affinity can be exploited to identify test patterns that can maximize switching in the suspicious (target) region while minimize switching in the rest of the circuit in order to significantly improve the side-channel sensitivity. A genetic algorithm can be utilized to quickly find the profitable test patterns in order to improve the test generation time, and the significant improvement in sensitivity can enable an exemplary approach of the present disclosure to detect the majority of Trojans (out of randomly inserted 1000 Trojans), while the state-of-the-art approaches can detect less than 1% Trojans.

Existing Trojan detection techniques can be broadly classified into two categories: logic testing and side-channel analysis. Logic testing in Trojan detection has been extensively explored, such as Automatic Test Pattern Generation (ATPG) and N-detect testing. The Multiple Excitation of Rare Occurrence (MERO) approach utilized the idea of N-detect testing to achieve a high coverage over randomly sampled Trojans, assuming the trigger conditions of the Trojans consist of rare nodes only. It was observed that if the generated test patterns are able to satisfy all rare values N times, it is highly likely that rare trigger conditions are satisfied when N is sufficiently large. Logic testing approaches have several limitations such as lack of scalability due to long test generation time even for small benchmarks, restrictions of the trigger conditions being fully activated, and the effect of the inserted Trojan propagating to the observable points. Side-channel analysis overcomes these disadvantages. Trojan detection using side-channel analysis measures transient current, power consumption, or path delay both in the golden design and the design under test. If the measured signals from these two designs vary by a threshold, a Trojan is suspected to be present.

Figure 1:
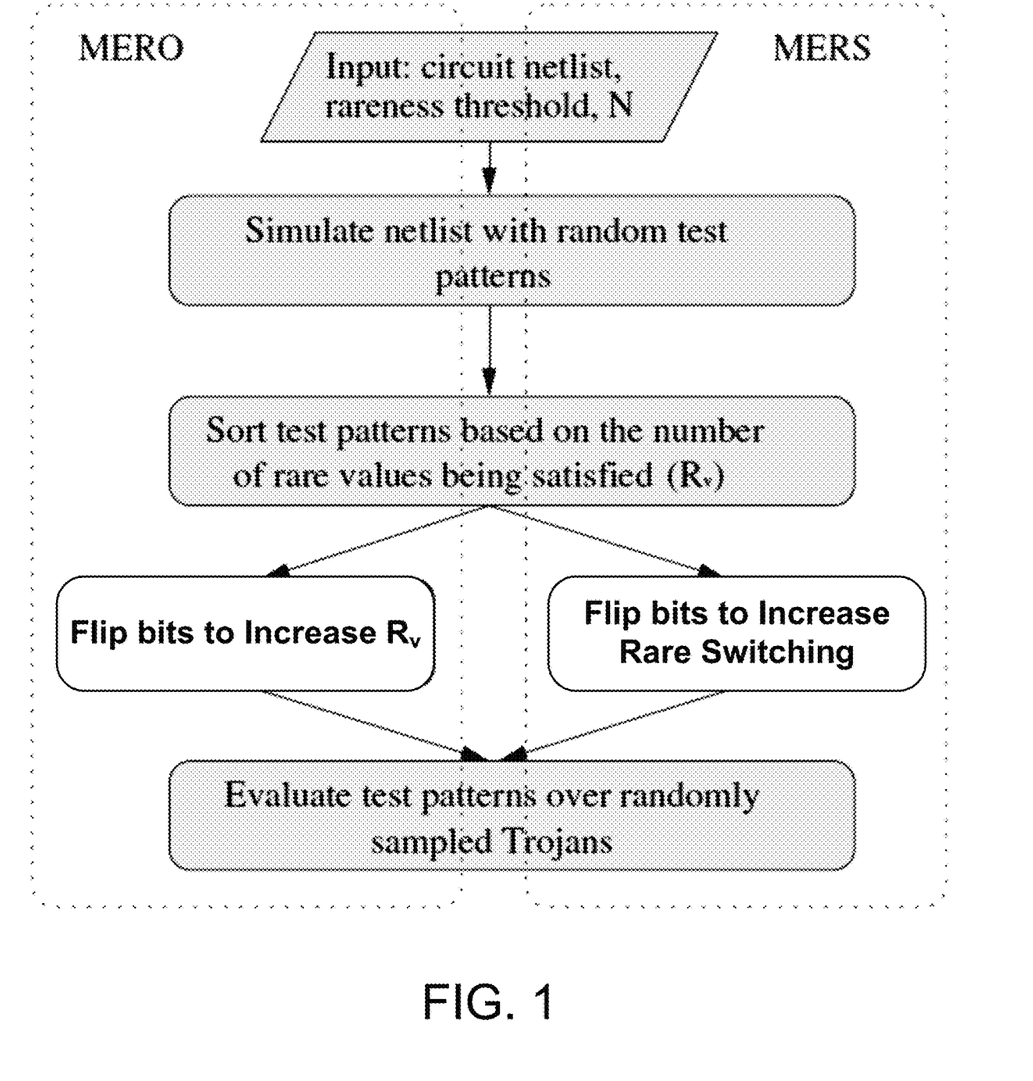
FIG. 1 is a diagram illustrating a test generation framework to maximize sensitivity of dynamic current in an integrated circuit for Multiple Excitation of Rare Switching (MERS) and Multiple Excitation of Rare Occurrence (MERO) Trojan detection techniques.

Huang et al. extended the idea of the N-detect test for side-channel analysis, and proposed a test generation framework called MERS to maximize the sensitivity of dynamic current in the following paper: Y. Huang, S. Bhunia, and P. Mishra, "MERS: Statistical test generation for side-channel analysis based Trojan detection," in ACM CCS, 2016. The frameworks of MERS and MERO are similar as shown in FIG. 1. In the figure, MERS counts the number of rare switching, and MERO counts the number of activated rare values.

In particular, MERS generates compact test patterns to let each rare node switch from its non-rare value to its rare value N times, increasing the probability of partially or fully activating a Trojan. The side-channel sensitivity of MERS is too small, typically less than 3% in most benchmarks, compared to large (7-17%) environmental noise and process variations in today's CMOS (Complementary Metal-Oxide-Semiconductor) circuits. The low side-channel sensitivity is due to the inherent restriction of reordering within the set of test patterns generated by MERS, whereas exemplary approaches of the present disclosure are able to effectively search for efficient tests that can drastically improve the side-channel sensitivity—making Trojan detection feasible in practice.

Searching for the best solution in a given search space is a prevalent optimization problem. Genetic algorithms (GA) are an often used evolutionary search algorithm inspired by natural selection. In the test generation domain, a genetic algorithm is shown to be successful in fault coverage and Trojan detection. The present disclosure is believed to present the first attempt in utilizing genetic algorithms for side-channel analysis aware test generation.

A goal of the present disclosure is to generate l compact test pattern pairs $(u_i, v_i)$ (i=1, 2, . . . , l) that can maximize the dynamic current based side-channel sensitivity. For each pair of test patterns $(u_i, v_i)$, the current switching in a golden design G is measured by applying $u_i$ followed by $v_i$, i.e., $switch_{u_i,v_i}^G$. The current switching in the Trojan-inserted design $G^T$ is defined in the same way, i.e., $switch_{u_i,v_i}^{G^T}$. The relative switching is computed as $|switch_{u_i,v_i}^G - switch_{u_i,v_i}^{G^T}|/switch_{u_i,v_i}^G$. Given the test pattern pairs, the sensitivity of a Trojan T is defined as the maximum of the relative switching over all pairs, as shown in Equation 1:

$$sensitivity_T = \max_{(u_i,v_i)}\left(\frac{|switch_{u_i,v_i}^G - switch_{u_i,v_i}^{G^T}|}{switch_{u_i,v_i}^G}\right) \quad (1)$$

Figure 2A:
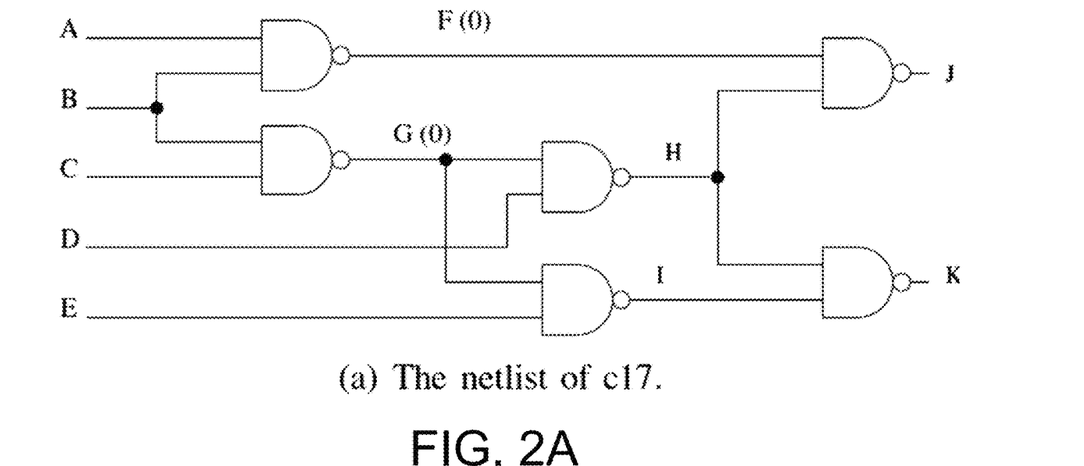
FIG. 2A is a diagram illustrating a netlist of a benchmark circuit c17 from ISCAS'85 as a golden design.

To illustrate how to improve sensitivity in a dynamic current based side-channel analysis, a small benchmark c17 from ISCAS'85 is used as an example of a golden design with its netlist shown in FIG. 2A. A Rareness threshold is set to be 0.3, which means rare values are satisfied with less than 30% probability in random simulation, e.g., F and G are the two rare nodes in this design with their rare values of 0 in FIG. 2A.

Figure 2B:
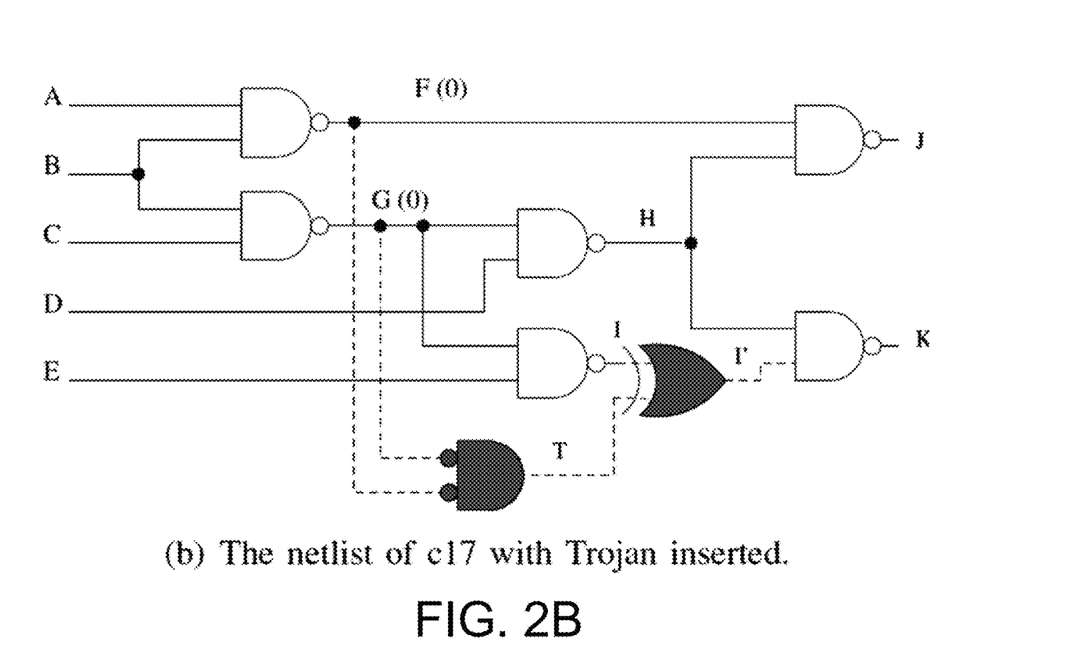
FIG. 2B is a diagram illustrating the circuit of FIG. 2A with a Trojan circuit inserted.

Assume an attacker uses rare nodes F and G as the trigger condition and constructs a Trojan as shown using the dashed lines in FIG. 2B. To detect this Trojan, applying the pair of test patterns (u, v)=(11100, 10100) on inputs (<A, B, C, D, E>) is an ideal choice, with only B switching from '1' to '0'. The current switching in the golden design $switch_{u,v}^G$ is 4 (switching of signals B, F, G, and J) and the current switching in the Trojan inserted design $switch_{u,v}^{G^T}$ is 7 (switching of signals B, F, G, J, T, I', and K). Thus the sensitivity is 75% in this example. An important observation is that by flipping only a small number of relevant inputs (B in this example) while preserving the others, the switching activities in the Trojan area are maximized while the current switching in the golden design is minimized. In other words, if the affinity between inputs and the rare nodes is exploited while creating a pair of test patterns (u followed by v), it can lead to significant improvement in sensitivity for Trojan detection.

Figure 3:
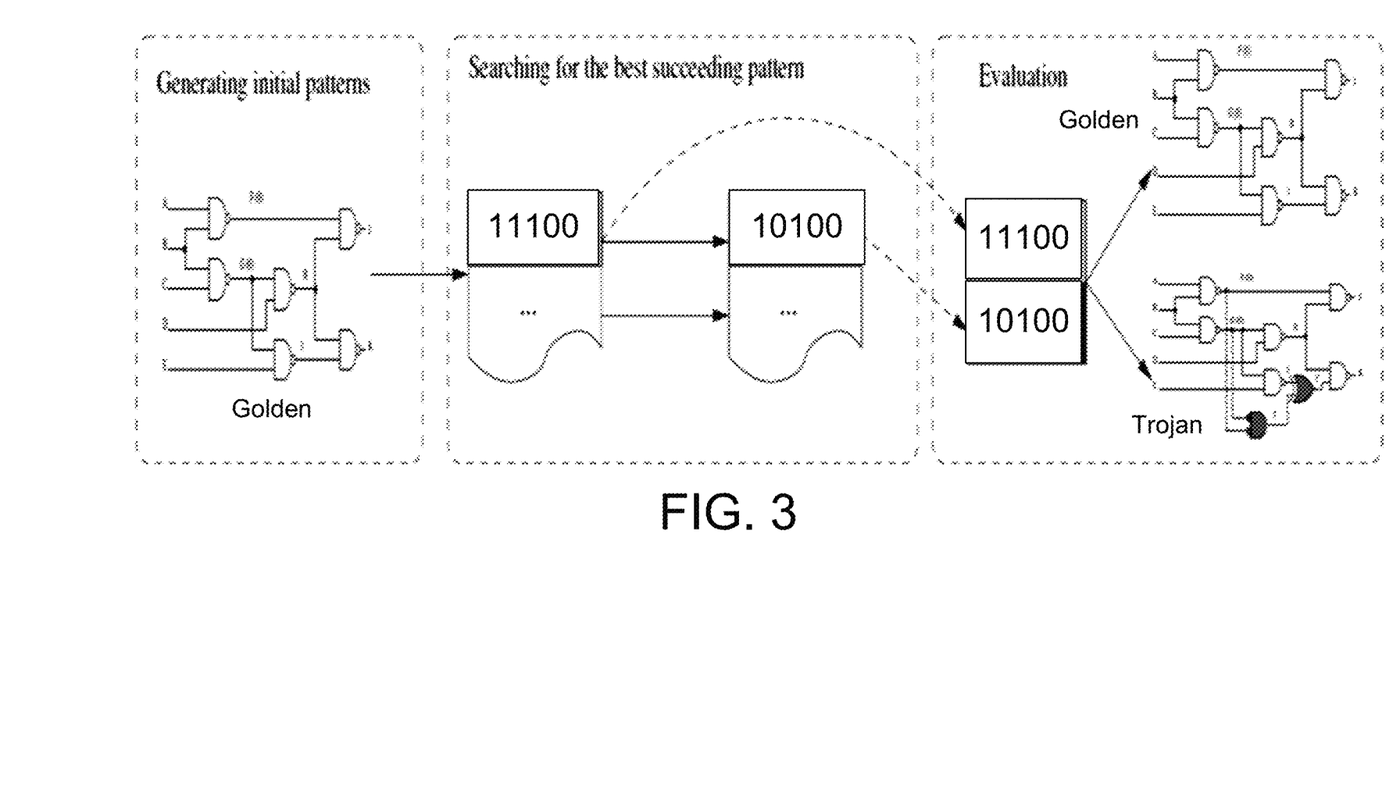
FIG. 3 is a diagram illustrating an overview of an exemplary method of generating effective pairs of test patterns for detecting Trojan hardware in accordance with embodiments of the present disclosure.

FIG. 3 shows an overview of an exemplary approach in accordance with embodiments of the present disclosure. The task of test generation is divided into two sub-problems: (i) generation of good initial test patterns that can trigger rare conditions and (ii) given any test pattern generated in the previous step, searching for the best succeeding pattern that can maximize side-channel sensitivity. Accordingly, the overview of FIG. 3 shows three notable steps. The first step finds the profitable initial test patterns. The next step forms the effective pair of test patterns. Finally, the quality of the generated pairs of test patterns is evaluated.

By inspecting the capability of (11100, 10100) for c17, the task of searching for effective pairs of test patterns is divided into two sub-problems. The first of which is the (1) generation of good initial test patterns that can trigger rare conditions, e.g., 11100 in the previous example. As the difference of current switching in designs with/without Trojans comes from the inserted circuits and the switching after payloads are activated and propagated, the sensitivity can be improved if the test patterns can trigger rare conditions. The second problem is (2) the search for the best succeeding pattern v to maximize the sensitivity, e.g., 10100 in the previous example, given any test pattern u generated in the previous step.

However, there are three main challenges in searching for the best succeeding pattern for u. First, randomly selected pairs may not lead to high sensitivity, even if the two patterns are similar. For example, if one applies (u, v)= (11100, 11101) to the previous example, the current switching in G and $G^T$ remains the same, revealing no side-channel footprint. Second, the whole search space is exponentially large ($2^n$, where n is the number of inputs in the design). So, searching for the whole space is not feasible. Based on affinity heuristic, the neighbor of u with Hamming distance less than k is the optimized search space. One naive way is to use breadth-first-search (BFS) according to the Hamming distance. However, the searching complexity is still $O(n^k)$. Third, there is a tradeoff between introducing switching in the rare nodes and minimizing switching in the golden design. Introduction of as much switching in all rare nodes as possible is needed, since we have no knowledge of the trigger condition. However, for a design with thousands of rare nodes, introducing switching for all of them can lead to significant increase in switching of the golden design. In that case, even if the Trojan is fully activated, the sensitivity (extra switching) can be too small compared to process and noise margins.

An exemplary approach of the present disclosure addresses these challenges by using a genetic algorithm as an approximate and optimized replacement of BFS. The first population in GA is initialized with random test patterns that have fixed small Hamming distance from u. By crossover and mutation, the Hamming distance is expected to grow slowly. After several generations, a majority of the profitable test patterns in the expected search space are likely to be visited.

The sensitivity of side channel analysis is maximized if the test pattern pairs are able to partially or fully activate a trigger condition. Thus, the first task is similar to other logic testing techniques, such as ATPG or N-detect approaches. In one embodiment, MERO is selected to be used to generate N-detect test patterns given that the generated test patterns are compact and can statistically achieve good coverage when N increases. MERO is used as a black box in an exemplary approach, and the parameters are introduced in the discussion below related to experimental setup and results. The generated l test patterns are denoted as $\{u_i\}$ (i=1, 2, ..., l). The second task is to find the best succeeding pattern $v_i$ for each $u_i$, such that the relative switching is maximized. To achieve both high-quality pairs and test generation efficiency, a genetic algorithm is used as the searching algorithm in accordance with various embodiments of the present disclosure.

Figure 4:
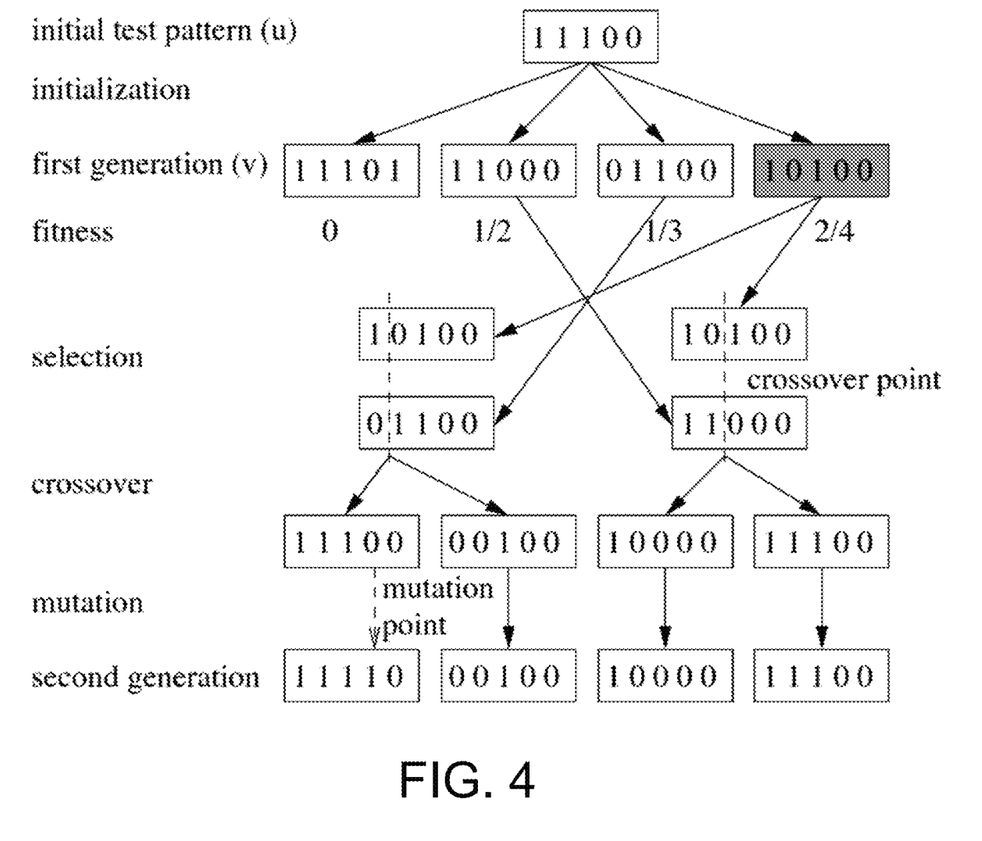
FIG. 4 is a diagram illustrating an exemplary iteration of a genetic algorithm for generating a second test pattern for an initial first test pattern in accordance with embodiments of the present disclosure.

A genetic algorithm forms the main part of an exemplary test generation, referred to as Algorithm 1 (below), which includes four major steps: initialization, fitness computation, selection, and crossover & mutation. The fitness is defined in Equation 2 (below), where $\text{rare\_switch}_{u,v}^G$ represents the current switching of all rare nodes in G when applying the test pattern u followed by v. A profitable test pattern should maximize the current switching in rare nodes to increase the probability of activating a Trojan, and minimize the switching in the golden design. The best succeeding pattern $v_i$ for a given preceding $u_i$ is the one achieving highest fitness value over all generations (line 12). The first iteration of GA for c17 is shown in FIG. 4, assuming 4 individuals in each generation. The first iteration of GA is for generating the best succeeding pattern for 11100. The initial Hamming distance is 1 and the number of individuals for each generation is 4. Crossover point and mutation point are selected randomly. Fitness values are shown as the numerator representing rare switching $\text{rare\_switch}_{u_i,v}^G$ and the denominator representing total switching $\text{switch}_{u_i,v}^G$. The best succeeding pattern $v_i$ is the individual with the largest fitness value over all generations as shown in the shaded box of FIG. 4.

$$\text{fitness}_u(v) = \frac{\text{rare\_switch}_{u,v}^G}{\text{switch}_{u,v}^G} \quad (2)$$

| Algorithm 1 Test Generation |
| --- |
| Input: circuit netlist, N |
| Output: pairs of test patterns |
| 1:     Simulate the circuit netlist with random test patterns |
| 2:     Generate N-detect test patterns $\{u_i\}$ (i = 1, 2, ..., l) |
| 3:     for i = 1 to l do |
| 4:         Initialization of GA with $u_i$ |
| 5:         For each individual v, compute $\text{fitness}_{u_i}(v)$ by simulating the netlist with the pair of test patterns $(u_i, v)$ |
| 6:         for gen = 1 to generations do |
| 7:             Selection of parents from the $\text{gen}^{th}$ generation based on fitness values |
| 8:             Single point crossover to produce children |
| 9:             Single point mutation according to mutation rate |
| 10:            Compute fitness for the children ((gen + 1)$^{th}$ generation) |
| 11:         end for |
| 12:         Select the best individual over all generations as $v_i$ |
| 13:     end for |
| 14:     Return the pairs of test patterns $(u_i, v_i)$ (i = 1, 2, ..., l) |

Algorithm 1 provides the following steps. (1) Initialization Step: The first population is initialized with random test patterns that are similar to $u_i$. Each individual in the initial population has Hamming distance k from $u_i$. During experiments, k is chosen to be max(0:4%|$u_i$|, 1). (2) Fitness Computation Step: For each individual v, the golden design G is simulated with the pair of test patterns ($u_i$, v). Then the fitness of v is computed by Equation 2. For example, the fitness values for four candidates are shown in FIG. 4. (3) Selection Step: Selection is based on the fitness of each individual. Individuals with higher fitness are more likely to be selected. The selection shown in FIG. 4 demonstrates that the individuals with higher fitness values (such as 10100) are more likely to be selected than the ones with lower fitness values (such as 11101). (4) Crossover and Mutation Step: During crossover, a single crossover point is randomly selected, and crossover is performed on parents to produce two children. During mutation, a randomly selected position is mutated with a low mutation rate. For example, FIG. 4 shows only 1 mutation for 4 individuals.

Figure 6:
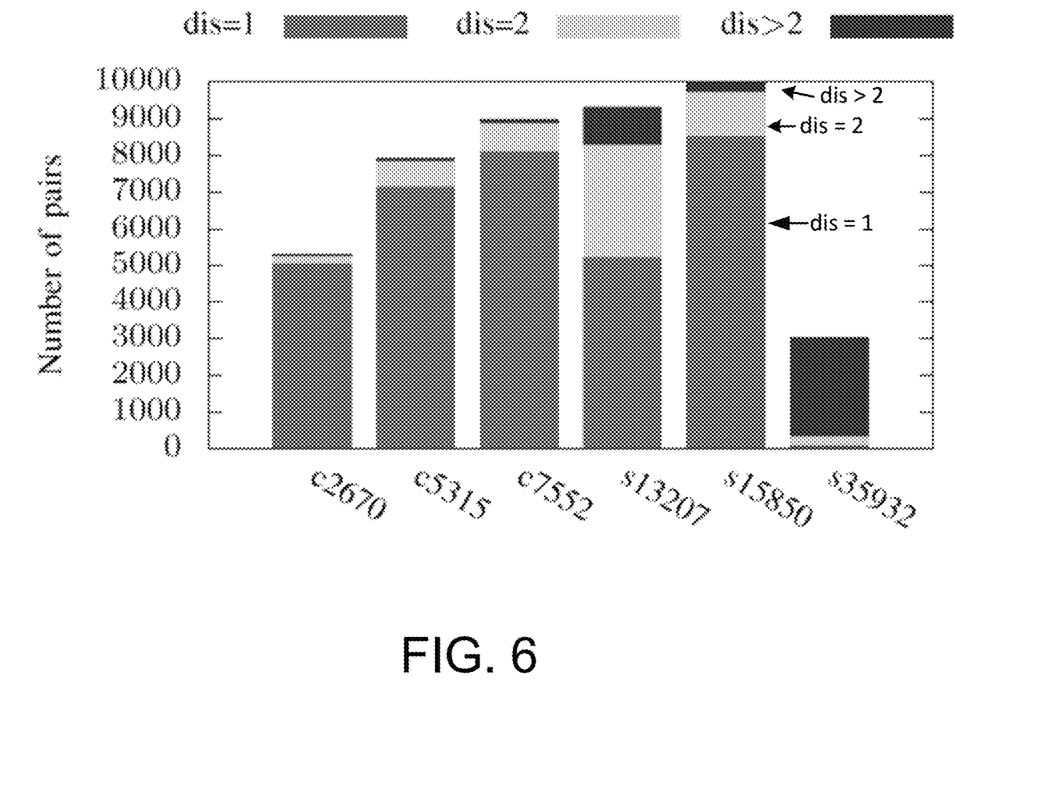
FIG. 6 is a diagram illustrating that test patterns having small Hamming distances provide significant improvement in sensitivity in accordance with embodiments of the present disclosure.

Although the Hamming distance of all individuals in the initial generation and $u_i$ is small, crossover and mutation will increase the Hamming distance between each generation and $u_i$. Theoretically, the largest possible Hamming distance between the $i^{th}$ generation and $u_i$ is at most $2^{i}*|k|$ considering only crossover. In order for all test patterns to be evaluated with some probability, the total number of generations should be large enough to allow $|u_i|$ Hamming distance. However, the affinity heuristic suggests that only a small number of generations may be needed. During experiments, the number of generations is fixed to be 5. So the maximum Hamming distance could be $2^5 \times 0:4\%|u_i|$ which is around $10\%|u_i|$. By exploring around $u_i$ with low Hamming distance, high quality pairs are expected to be obtained efficiently. As shown in FIG. 6, most profitable pairs of test patterns have small Hamming distances (dis) that provided significant improvement in sensitivity.

To evaluate the effectiveness of an exemplary approach, in accordance with embodiments of the present disclosure, an exemplary framework was implemented in C++. Since MERS is the state-of-the-art, exactly the same benchmarks were used as MERS—a subset of ISCAS-85 and ISCAS-89 gate-level benchmark circuits. Experiments were performed on a machine with Intel Xeon E5-2698 CPU @2.20 GHz. The results of an exemplary approach was compared to MERS-s (MERS with simulation based reordering) with C=5.0 (best result settings from Huang et al. paper). We did not compare with random tests and MERS (with Hamming distance) since MERS-s outperforms them.

First, the benchmarks are simulated with random test patterns, and the probability of each node achieving each possible value is calculated. All the nodes with probability lower than the rareness threshold is marked as rare nodes. To enable a fair comparison, similar to MERS, the number of random test patterns and a rareness threshold is set to 10,000 and 0.1, respectively, for all benchmarks. By applying N-detect approach with N=1000, the initial test patterns are generated. The length of test patterns and the running time of MERO and MERS are reported in Table I (below).

The length of each test pattern is the number of primary inputs for combinational circuits, and the number of primary inputs plus the number of flip-flops in sequential circuits (same full-scan assumption as MERS). As the algorithms of MERS and MERO are almost the same, the running time and the length of test patterns by these two approaches are similar. The small difference in the length of test patterns is because MERO asks for N times activation of rare values, while MERS asks for N times switching from non-rare values to rare values.

TABLE I

MERO AND MERS TEST PATTERN LENGTH AND RUNTIME

| Benchmarks | #Rare nodes | #Test patterns MERO/MERS | Length of One Test | Running time (s) |
|---|---|---|---|---|
| c2670 | 64 | 5300/5306 | 233 | 444 |
| c5315 | 255 | 7927/8066 | 178 | 1589 |
| c7552 | 306 | 8971/7935 | 207 | 2884 |
| s13207 | 604 | 9304/9659 | 687 | 5517 |
| s15850 | 681 | 9445/9512 | 590 | 6042 |
| s35932 | 896 | 3034/3083 | 1764 | 11047 |

Trojans are randomly generated with 8 triggers from rare nodes and one payload each (same as MERS). 1000 Trojans are randomly sampled from each benchmark. The probability of activating these Trojans using random simulation is at most $10^{-8}$ if the triggers are independent.

In an exemplary GA-based framework, the number of individuals is set to be 200 in each generation, the number of generations to be 5, and mutation rate to be 0.1. For each test pattern $u_i$ generated by N-detect approach, the GA generates a test pattern $v_i$ to form a pair. Then, test patterns $\{(u_i, v_1)\}$ are applied to both the golden design and the Trojan inserted design. Table II (FIG. 5C) shows the result of an exemplary approach compared to MERS-s.

The sensitivity of test patterns is measured by the average of the sensitivities over 1000 randomly sampled Trojans. The original switching represents the current switching in the golden design. The two columns of time in Table II (FIG. 5C) represent the running time for simulation-based reordering for MERSs, and searching for succeeding patterns in an exemplary approach of the present disclosure, respectively. The sensitivity threshold of 10% is used. The percentage of Trojans detected in the last columns of MERS-s and the exemplary approach shows the fraction of Trojans whose sensitivity is above this threshold.

Figure 5A:
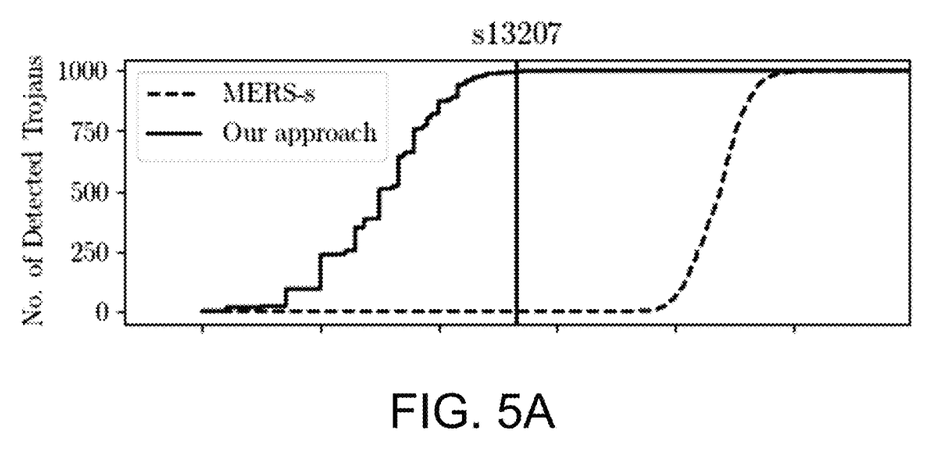
FIGS. 5A-5B are diagrams presenting a comparison of cumulative distributions of sensitivities by an exemplary method for generating test patterns versus MERS-s in a subset of ISCAS-89 benchmark circuits in accordance with embodiments of the present disclosure.
Figure 5B:
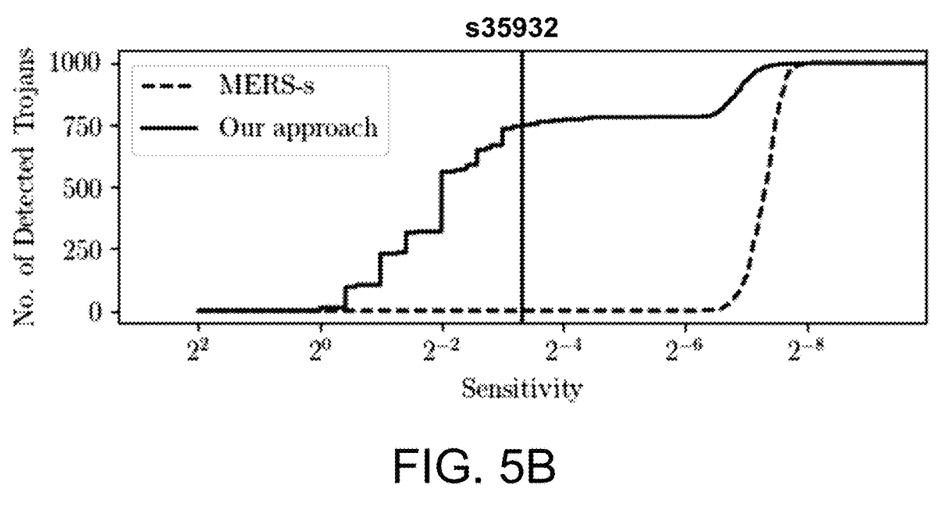
Figure 5C:
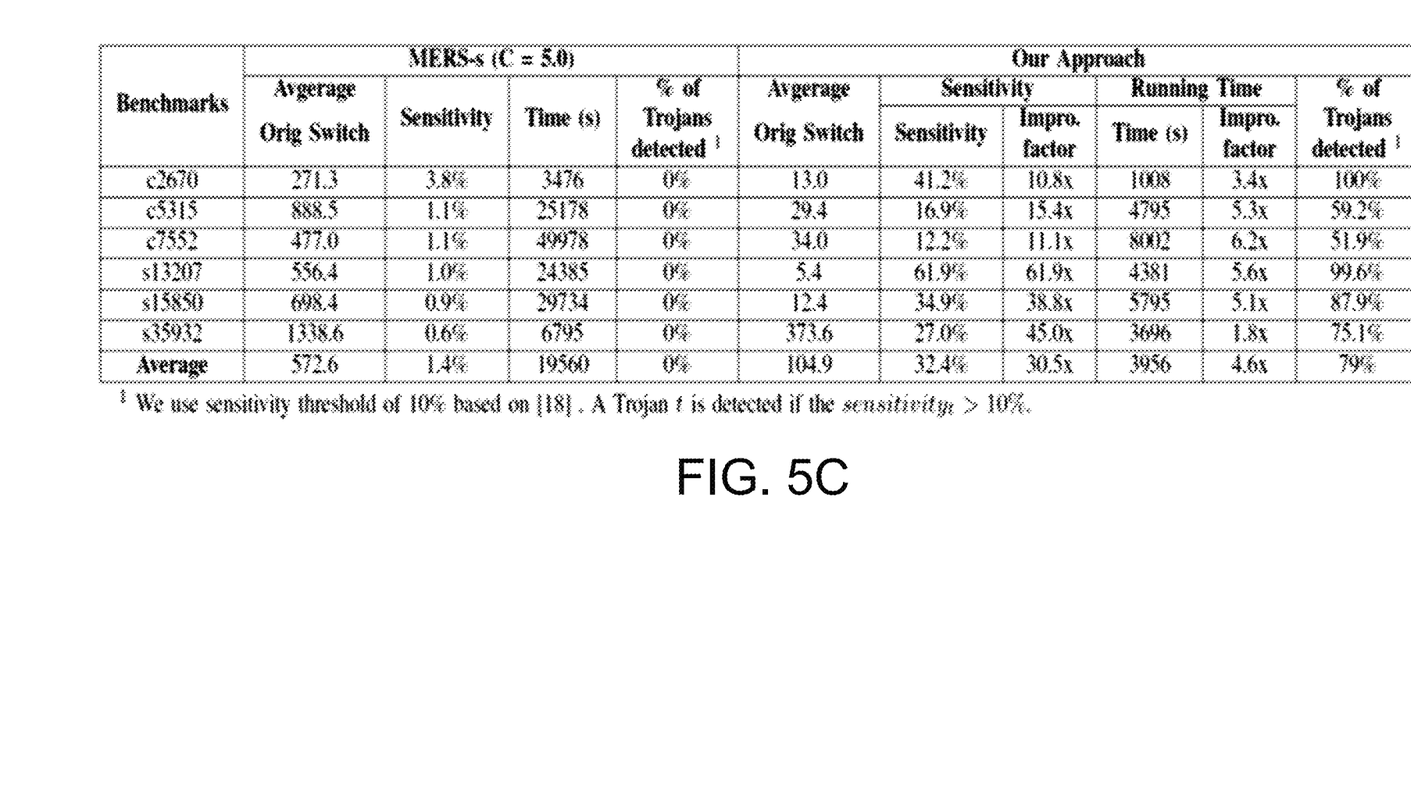
FIG. 5C is a diagram illustrating a comparison of test generation techniques using MERS-s (C=5.0) and an exemplary method of the present disclosure in over 1000 random 8-trigger Trojans.

As shown in FIG. 5C, Table II provides a comparison of MERS-s (C=5.0) with an exemplary approach in over 1000 random 8-trigger Trojans. An exemplary approach can provide an order-of-magnitude improvement in sensitivity while reducing the test generation time by 4.6× on average. As a result, an exemplary approach can detect almost all the Trojans in a majority of the benchmarks while MERS fails to detect any of them.

The following points of comparison are noted and discussed below: (1) Test length comparison; (2) Sensitivity comparison; and (3) Test generation time. First, as an exemplary approach finds a pair for each test pattern generated by N-detect, the total length of the test patterns generated by an exemplary approach is twice the number of the test patterns shown in Table I. MERS-s reorders the test patterns generated by MERS without generating any new test pattern. So the length of test patterns by an exemplary approach is twice the number of test patterns by MERS-s. However, as the current switching for each pair is measured, and MERS-s measures the current switching between each two sequential test patterns, the total numbers of measurements are the same.

Second, the overall sensitivity of an exemplary approach improves by a factor of 30.5 compared to MERS-s. Table II (see FIG. 5C) indicates that the advantage of an exemplary approach compared to MERS lies in effective reduction of original switching. As the reordering of MERS restricts each test pattern to find its pair from MERS test patterns, the minimum original switching that reordering can achieve is bounded by the optimum pairs inside these test patterns. On the other hand, an exemplary approach fixes the preceding pattern to be good at activating trigger condition and searches the whole space for profitable succeeding patterns to minimize the original switching.

Next, the sensitivity for each Trojan independently is inspected. The cumulative distribution of the sensitivities over in 1000 Trojans in s13207 and s35932 are shown in FIGS. 5A-5B for an exemplary approach and MERS-s. The figures provide a comparison of cumulative distributions of sensitivities by an exemplary approach versus MERS-s in over 1000 Trojans, in which the x-axis is the sensitivity, y-axis is the number of Trojans that have sensitivities greater than x, and the vertical line represents 10% sensitivity or process variations as a threshold to detect Trojans. For example in s13207, almost all the Trojans have sensitivities greater than the sensitivity threshold in an exemplary approach, while in MERS-s this number is 0. In other words, if we assume the process variation is 10%, an exemplary approach can detect the majority of these randomly sampled Trojans with high confidence, while MERS-s cannot detect any of them. The exact numbers are reported in the last columns of both approaches in Table II (FIG. 5C). Overall, an exemplary approach can detect majority of the Trojans in most of the benchmarks due to higher sensitivity provided by the test patterns, whereas the test patterns generated by MERS fail to detect any of them.

Third, the test generation time of an exemplary approach is compared with MERS-s. Table II (FIG. 5C) indicates that an exemplary approach is much more efficient than MERS-s by an improvement factor of 4.6. The running time of reordering in MERS-s is $O(n^2/2)$ to simulate each pair of MERS test patterns, where n is the number of test patterns generated by MERS. The time complexity of an exemplary approach is $O(n*1000)$. As for each test pattern in MERO, 5 generations and 200 individuals for each generation are evaluated. As the numbers of MERS test patterns and MERO test patterns are almost the same, an exemplary approach is significantly faster than MERS-s (up to 6.2×, 4.6× on average).

For each test pattern u from experimental testing evaluation, the best succeeding pattern v is found by a genetic algorithm (GA) with 5 generations. Thus, the maximum possible Hamming distance between u and v can be as large as 10%|u|. To empirically demonstrate the validity of the affinity heuristic, we want to show that the optimum solution v comes from the small neighborhood of u.

The Hamming distances of all optimum test pattern pairs are plotted in FIG. 6. One can see that the majority of Hamming distances are less than 3. Actually, most of the distances (dis) are 1 for all benchmarks except s35932. The results indicate why a small number of generations (faster runtime) can provide significant sensitivity improvement.

Side-channel analysis provides a promising approach for Trojan detection. State-of-the-art test generation technique (e.g., MERS) is not beneficial for large designs due to its high runtime complexity. Most importantly, the sensitivity obtained by existing approaches is very low compared to environmental noise and process variations, making them useless in practice. An exemplary approach addresses both limitations by developing a genetic algorithm based test generation algorithm that can lead to a drastic increase in sensitivity while significantly reducing the test generation time. An exemplary approach can be broken down into two tasks. The first task generates efficient test patterns to maximize the excitation of rare values, such that the trigger conditions are satisfied statistically. The second task finds the best matching pair for each test pattern generated by the first task to maximize the sensitivity. In the present disclosure, it is demonstrated that the combination of N-detect test generation with genetic algorithm can generate significantly better test patterns than MERS. An exemplary test generation approach can improve both side-channel sensitivity (up to 61.9×, 30.5× on average) and test generation time (up 6.2×, 4.6× on average) compared to MERS. Experimental results demonstrated that an exemplary approach can detect the majority of Trojans in the presence of process variation and noise margin while existing state-of-the-art approaches fail.

Figure 7:
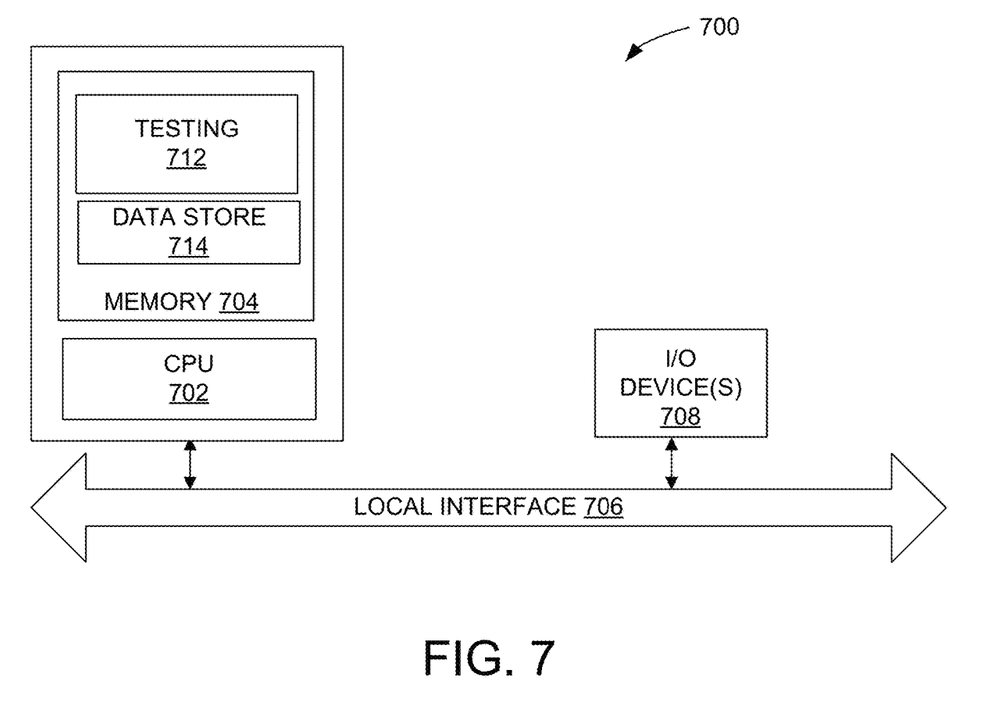
FIG. 7 depicts a schematic block diagram of a computing device that can be used to implement various embodiments of the present disclosure.

FIG. 7 depicts a schematic block diagram of a computing device 700 that can be used to implement various embodiments of the present disclosure. An exemplary computing device 700 includes at least one processor circuit, for example, having a processor 702 and a memory 704, both of which are coupled to a local interface 706, and one or more input and output (I/O) devices 708. The local interface 706 may comprise, for example, a data bus with an accompanying address/control bus or other bus structure as can be appreciated.

Stored in the memory 704 are both data and several components that are executable by the processor 702. In particular, stored in the memory 704 and executable by the processor 702 are testing logic/instructions 712 (e.g., Algorithm 1) that are configured to produce a test pattern that is likely to maximize side-channel sensitivity in a test integrated circuit device and perform side-channel analysis after application of a test pattern. Also stored in the memory 704 may be a data store 714 and other data. The data store 714 can include a threshold value that can be compared against measured side-channel parameters, and potentially other data. In addition, an operating system may be stored in the memory 704 and executable by the processor 702. The I/O devices 708 may include input devices, for example but not limited to, a keyboard, mouse, etc. Furthermore, the I/O devices 708 may also include output devices, for example but not limited to, a printer, display, etc.

Certain embodiments of the present disclosure can be implemented in hardware, software, firmware, or a combination thereof. Embodiments implemented in software or firmware can be stored in a computer readable medium, such as memory, and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments of the present disclosure includes embodying the functionality of certain embodiments of the present disclosure in logic embodied in hardware or software-configured mediums.

It should be emphasized that the above-described embodiments of the present disclosure are merely possible examples of implementations, merely set forth for a clear understanding of the principles of the present disclosure. Many variations and modifications may be made to the above-described embodiment(s) of the present disclosure without departing substantially from the principles of the present disclosure. All such modifications and variations are intended to be included herein within the scope of this disclosure.

The invention claimed is:

1. A method comprising:
    generating a plurality of initial test patterns that can trigger a rare condition of a Trojan circuit in an integrated circuit;
    generating one succeeding test pattern for each of the plurality of initial test patterns that can increase side-channel sensitivity during changing from the initial test pattern to the succeeding test pattern;

applying a test pattern comprising the initial test pattern followed by a corresponding succeeding test pattern to a golden design of the integrated circuit;

measuring a side-channel parameter in the golden design of the integrated circuit after application of the test pattern;

applying the test pattern to a design of the integrated circuit under test;

measuring the side-channel parameter in the design of the integrated circuit under test after application of the test pattern; and determining the Trojan circuit to be present in the integrated circuit under test when the measured side-channel parameters vary by a threshold.

2. The method of claim 1, wherein the initial test patterns comprises N-detect test patterns.

3. The method of claim 2, wherein the succeeding test patterns are generated using a genetic algorithm.

4. The method of claim 1, wherein application of the test pattern maximizes switching in a first portion of the integrated circuit containing the Trojan circuit while minimizing switching in a remainder of the integrated circuit in order to improve the side-channel sensitivity.

5. The method of claim 1, wherein the side-channel parameter comprises a dynamic current.

6. The method of claim 1, wherein the side-channel parameter comprises power consumption.

7. The method of claim 1, wherein the side-channel parameter comprises path delay.

8. A system for detecting a Trojan circuit in an integrated circuit comprising:
one or more computing processors; and
one or more memory storage elements;
wherein the one or more computing processors are configured to:
generate a plurality of initial test patterns that can trigger a rare condition of the Trojan circuit in the integrated circuit;
generate one succeeding test pattern for each of the plurality of initial test patterns that can maximize side-channel sensitivity during changing from the initial test pattern to the succeeding test pattern;
apply a test pattern comprising the initial test pattern followed by a corresponding succeeding test pattern to a golden design of the integrated circuit;
measure a side-channel parameter in the golden design of the integrated circuit after application of the test pattern;
apply the test pattern to a design of the integrated circuit under test;
obtain a measurement of the side-channel parameter in the design of the integrated circuit under test after application of the test pattern; and
determine the Trojan circuit to be present in the integrated circuit under test when the measured side-channel parameters vary by a threshold.

9. The system of claim 8, wherein the initial test patterns comprises N-detect test patterns.

10. The system of claim 9, wherein the succeeding test patterns are generated using a genetic algorithm.

11. The system of claim 8, wherein application of the test pattern maximizes switching in a first portion of the integrated circuit containing the Trojan circuit while minimizing switching in a remainder of the integrated circuit in order to improve the side-channel sensitivity.

12. The system of claim 8, wherein the side-channel parameter comprises a dynamic current.

13. The system of claim 8, wherein the side-channel parameter comprises power consumption.

14. The system of claim 8, wherein the side-channel parameter comprises path delay.

15. A computer-readable medium having instructions stored thereon that, in response to execution by a computer-based system, cause the computer-based system to perform operations comprising:
generating a plurality of initial test patterns that can trigger a rare condition of a Trojan circuit in an integrated circuit;
generating one succeeding test pattern for each of the plurality of initial test patterns that can increase side-channel sensitivity during changing from the initial test pattern to the succeeding test pattern;
applying a test pattern comprising the initial test pattern followed by a corresponding succeeding test pattern to a golden design of the integrated circuit;
measuring a side-channel parameter in the golden design of the integrated circuit after application of the test pattern;
applying the test pattern to a design of the integrated circuit under test;
measuring the side-channel parameter in the design of the integrated circuit under test after application of the test pattern; and
determining the Trojan circuit to be present in the integrated circuit under test when the measured side-channel parameters vary by a threshold.

16. The computer-readable medium of claim 15, wherein the initial test patterns comprises N-detect test patterns.

17. The computer-readable medium of claim 16, wherein the succeeding test patterns are generated using a genetic algorithm.

18. The computer-readable medium of claim 15, wherein application of the test pattern maximizes switching in a first portion of the integrated circuit containing the Trojan circuit while minimizing switching in a remainder of the integrated circuit in order to improve the side-channel sensitivity.

19. The computer-readable medium of claim 15, wherein the side-channel parameter comprises a dynamic current.

20. The computer-readable medium of claim 15, wherein the side-channel parameter comprises power consumption or path delay.

* * * * *